United States Patent
Yang et al.

(10) Patent No.: US 8,032,273 B2
(45) Date of Patent: Oct. 4, 2011

(54) SECTION OVERSPEED WARNING APPARATUS AND SYSTEM

(75) Inventors: Manseok Yang, Daejeon (KR); Changgyu Lim, Daejeon (KR); Hyungjoo Kim, Daejeon (KR); Taejoon Park, Seoul (KR); Taeman Han, Daejeon (KR); Dongsun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 690 days.

(21) Appl. No.: 12/121,566

(22) Filed: May 15, 2008

(65) Prior Publication Data

US 2009/0157249 A1    Jun. 18, 2009

(30) Foreign Application Priority Data

Dec. 12, 2007    (KR) .................. 10-2007-0128934

(51) Int. Cl.
*G01M 17/00*    (2006.01)
(52) U.S. Cl. ............. 701/29; 701/36; 701/66; 701/79; 701/93; 701/96; 340/425.5; 340/435; 340/441
(58) Field of Classification Search .............. 701/29, 701/33, 36, 74, 79, 93, 96, 119, 66; 340/435, 340/436, 441, 425.5
See application file for complete search history.

(56) References Cited

U.S. PATENT DOCUMENTS

| | | | | |
|---|---|---|---|---|
| 5,947,423 A | * | 9/1999 | Clifton et al. | 246/62 |
| 2007/0088478 A1 | * | 4/2007 | Mori et al. | 701/41 |

FOREIGN PATENT DOCUMENTS

| | | |
|---|---|---|
| KR | 1020000012959 A | 3/2000 |
| KR | 10-2003-0039833 A | 5/2003 |
| KR | 10-2003-0072738 A | 9/2003 |

* cited by examiner

*Primary Examiner* — Gertrude Arthur Jeanglaude

(57) ABSTRACT

In a section overspeed regulating method of determining whether a vehicle overspeeds on the basis of whether an average speed of the vehicle in a regulation section exceeds a speed limit, the section overspeed warning apparatus and system determine whether the current speed of the vehicle traveling on a regulation section exceeds the speed limit, and warn a driver. Whether the speed of the vehicle traveling on the regulation section exceeds the speed limit of the section is determined depending on a travel distance from a starting position of the regulation section to a current position of the vehicle, a travel time taken for the vehicle to travel by the travel distance, and a remaining distance from the current position of the vehicle to an end position of the regulation section. If it is determined that the current position of the vehicle will exceed the speed limit of the section, overspeed warning messages are output in the form of text, voice, or warning sound. Further, the section overspeed warning apparatus and system recommend the maximum speed, which allows the vehicle not to violate the speed limit of the section at the current position, to a driver as a recommended speed.

13 Claims, 3 Drawing Sheets

SECTION OVERSPEED WARNING APPARATUS AND SYSTEM

BACKGROUND OF THE INVENTION

1. Field of the Invention

The present invention relates to a section overspeed warning apparatus and system, and more particularly, to a section overspeed warning apparatus and system using a navigation device.

The present invention was supported by the IT R&D program of MIC/IITA [2006-S-038-02, Development of Device-Adaptive Embedded Operating System for Mobile Convergence Computing].

2. Description of the Related Art

Various transportation means, such as ships, aircrafts, and automobiles, have used a navigation device that is provided with a global positioning system (GPS) for confirming a current position and moving speed of corresponding transportation means or determining a travel path. The navigation device receives radio waves corresponding to latitude, longitude, and altitude from a plurality of artificial satellites, and calculates the current position of the vehicle, and then displays map information including the current position to a driver.

Further, the navigation device provides various information, which may be required to the drive the vehicle, such as a travel direction of the vehicle, a distance to a destination, and the current speed of the vehicle, to a driver.

The navigation device is also used to warn a driver of the overspeed of the vehicle. In general, the driver obtains information about the speed limit of the road section on which the vehicle travels from the navigation device, and the navigation device calls the driver's attention to the overspeed or warns the driver of the overspeed not to exceed the speed limit in correspondence to the speed of the traveling vehicle. The driver previously perceives a regulation position from the overspeed attention or overspeed warning output from the navigation device, thereby observing the speed limit.

A known method of warning of overspeed may be effective in an unmanned traffic regulation system that regulates speed violation at a specific position. However, there is a problem in that the known method of warning of overspeed cannot effectively be used in a so-called section regulating method that measures an average speed of the vehicle in a specific section and regulates the overspeed over the speed limit.

SUMMARY OF THE INVENTION

Accordingly, it is an object of the present invention to provide a section overspeed warning apparatus and system for warning a driver of a vehicle, which travels on a road section where overspeed is regulated by a so-called section regulating method, of the overspeed of the vehicle.

It is another object of the present invention to provide a section overspeed warning apparatus and system capable of recommending an appropriate vehicle speed, which does not exceed a speed limit of a section.

In order to achieve the above-mentioned objects, according to an embodiment of the present invention, a section overspeed warning apparatus warns a driver of vehicle overspeed in an overspeed regulation section that has a regulation start position and a regulation end position. The section overspeed warning apparatus includes a distance detecting unit, a time detecting unit, a speed detecting unit, a speed determining unit, and an overspeed information output unit. The distance detecting unit detects a travel distance from the regulation start position to a current position of a vehicle and a remaining distance from the current position of the vehicle to the regulation end position. The time detecting unit detects a travel time taken for the vehicle to travel from the regulation start position to the current position of the vehicle. The speed detecting unit detects current speed of the vehicle. The speed determining unit determines whether the current speed of the vehicle will exceed a speed limit of the overspeed regulation section, by using the detected travel distance, remaining distance, and travel time. When it is determined that the current speed of the vehicle will exceed the speed limit, the overspeed information output unit outputs an overspeed warning message.

Further, in order to achieve the above-mentioned objects, according to another embodiment of the present invention, a section overspeed warning system warns a driver of vehicle overspeed in an overspeed regulation section having a regulation start position and a regulation end position. The section overspeed warning system includes a navigation device and a section overspeed warning apparatus. The navigation device supplies information about the regulation start position, the regulation end position, and a current position of a vehicle. The section overspeed warning apparatus detects whether the current speed of the vehicle will exceed a speed limit of the overspeed regulation section by using the information supplied from the navigation device, and informs the driver of the detection result. The section overspeed warning apparatus includes an information detecting unit, a speed determining unit, and an overspeed information output unit. The information detecting unit detects a travel distance from the regulation start position to the current position of the vehicle, a remaining distance from the current position of the vehicle to the regulation end position, and a travel time taken for the vehicle to travel from the regulation start position to the current position of the vehicle. The speed determining unit determines whether the current speed of the vehicle will exceed the speed limit, by using the detected travel distance, remaining distance, and travel time. The overspeed information output unit outputs an overspeed warning message when it is determined that the current speed of the vehicle will exceed the speed limit.

In this case, the speed determining unit may determine whether the current speed of the vehicle will exceed the speed limit under the assumption that the vehicle travels to the regulation end position constantly at the current speed. That is, when the following expression is satisfied, the speed determining unit may determine that the current speed of the vehicle will exceed the speed limit.

$$(\text{Expression})\ V1 \geq (S2 \times V) \div (S1 + S2 - T1 \times V)(\text{where, } T1 \leq (S1+S2) \div V)$$

V1: current vehicle speed, S1: travel distance, S2: remaining distance, T1: travel time, and V: speed limit.

Further, the overspeed information output unit may inform a driver of the vehicle of a result, which is obtained by calculating a right term of the expression, as a recommended speed. Furthermore, the information messages may be output on a display screen, or may be output in the form of voice or warning sound.

In addition, the current speed of the vehicle may be detected from the information about vehicle speed supplied from the navigation device.

According to the embodiments of the present invention, it is possible to warn a driver of a vehicle, which travels on a road section where overspeed is regulated by a so-called section regulating method, of the overspeed of the vehicle.

Further, according to the embodiments of the present invention, it is possible to recommend an appropriate vehicle speed that does not exceed a speed limit of a section.

DESCRIPTION OF THE PREFERRED EMBODIMENTS

Preferred embodiments of the present invention will be described below with reference to accompanying drawings.

Figure 1:
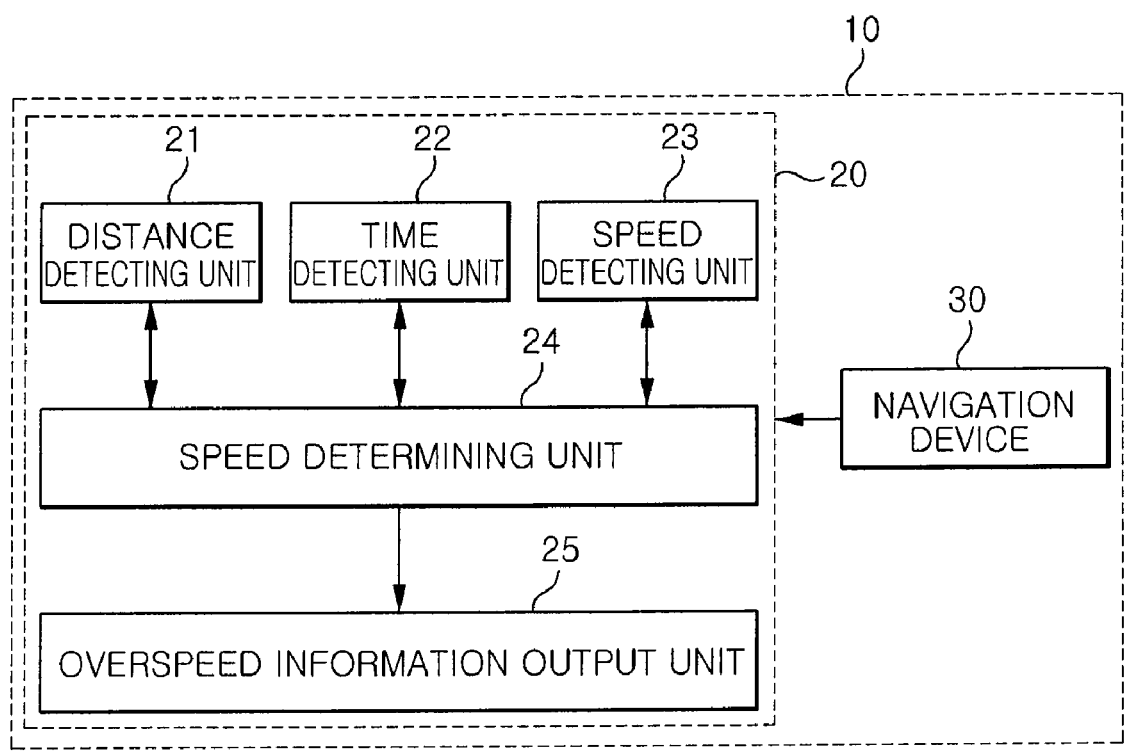
FIG. 1 is a block diagram of a section overspeed warning system 10 according to an embodiment of the present invention.

A section overspeed warning system 10 shown in FIG. 1 includes a section overspeed warning apparatus 20 according to an embodiment of the present invention and a navigation device 30. The section overspeed warning apparatus 20 includes a distance detecting unit 21, a time detecting unit 22, a speed detecting unit 23, a speed determining unit 24, and an overspeed information output unit 25.

The navigation device 30 includes a database including map information and a GPS receiver in order to provide data used to operate the section overspeed warning apparatus 20. The GPS receiver receives a current position of a vehicle and vehicle speed from an artificial satellite. The map information includes information (coordinates) about a starting position and an end position of a section that is a subject of section overspeed regulation. Further, the database includes information about a speed limit of a section that is a subject of section overspeed regulation, and information about a total length of the section. The navigation device 30 shows a screen, on which a current position of a vehicle is mapped to a point on a map, to a driver. Information about the current position of the vehicle, information about vehicle speed, and information about the database are supplied to the section overspeed warning apparatus 20. Further, the navigation device 30 also provides various information, which is required for driving the vehicle and includes a travel direction of the vehicle, a distance to a destination, and the moving speed of the vehicle, to a driver like in the related art.

Figure 2:
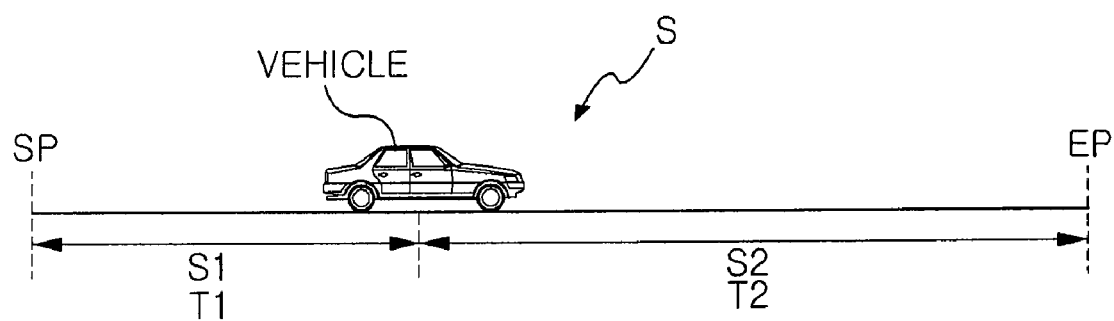
FIG. 2 is a conceptual diagram illustrating a section overspeed warning operation.

FIG. 2 schematically shows that a vehicle 40 travels in an overspeed regulation section S. The section S includes a regulation start position SP and a regulation end position EP. An unmanned section-overspeed regulation system detects time when the vehicle passes by the positions SP and EP, and calculates a period of time while the vehicle travels in the section S. Then, the unmanned section-overspeed regulation system determines whether the vehicle has oversped in the section S, on the basis of an average speed that is obtained by dividing the length of the section S into a travel time.

The distance detecting unit 21 calculates a distance S1 from the regulation start position SP to the current position of the vehicle 40, and a distance S2 from the current position of the vehicle to the regulation end position EP. The distances S1 and S2 may be calculated from the information about the current position of the vehicle and the information about the positions SP and EP, which are supplied from the navigation device 30 mounted on the vehicle. However, calculation of the distances S1 and S2 is not limited thereto.

The time detecting unit 22 detects a travel time T1 that is taken for the vehicle to travel from the regulation start position SP to the current position thereof. The travel time T1 is obtained by subtracting a time when the vehicle passes by the regulation start position SP from a time when the vehicle passes by the current position thereof. The time is measured by an internal timer. The time when the vehicle passes by the regulation start position SP is obtained by detecting a time when the information about the regulation start position SP supplied from the navigation device 30 corresponds to the information about the position of the vehicle 40.

The speed detecting unit 23 detects the current speed of the vehicle. The current speed of the vehicle is obtained from the information about the vehicle speed supplied from the navigation device 30, but is not limited thereto.

The speed determining unit 24 determines whether the speed of the vehicle at the current position thereof will exceed the speed limit V of the section S, by using the following expression. It is assumed that the vehicle travels to the regulation end position EP at a constant speed V1 of the current position.

If the following Expression (1) is satisfied, the vehicle violates the speed limit of the section.

$$(S1+S2) \div (T1+T2) \geq V \text{(where, } T1 \leq (S1+S2) \div V) \tag{1}$$

That is, if the average speed $(S1+S2) \div (T1+T2)$ of the vehicle is equal to or larger than the speed limit V of the section throughout the entire section S, the vehicle violates the speed limit of the section. However, if the travel time T1 of the vehicle until the current position of the vehicle is larger than the travel time $(S1+S2) \div V$ in the section S corresponding to the speed limit of the section, the vehicle does not violate the speed limit of the section at the current position of the vehicle.

Further, as described above, assuming that the vehicle travels to the regulation end position EP at a constant speed V1 of the current position, time T2 is obtained from the following Expression (2).

$$T2 = S2 \div V1 \tag{2}$$

When Expression (2) is substituted into Expression (1), the following Expression (3) is obtained. If the vehicle speed V1 at the current position satisfies Expression (3), the speed determining unit 24 determines that the speed of the vehicle is currently overspeeding. Then, the speed determining unit transmits the output of the determination to the overspeed information output unit 25.

$$V1 \geq (S2 \times V) \div (S1+S2-T1 \times V) \text{(where, } T1 \leq (S1+S2) \div V) \tag{3}$$

Furthermore, the speed determining unit 24 generally controls the operation of the distance detecting unit 21, the time detecting unit 22, the speed detecting unit 23, and the overspeed information output unit 25. That is, the speed determining unit 24 instructs the starting of the operation on the basis of the information supplied from the navigation device 30 from the time when the vehicle passes by the regulation start position SP so that the distance detecting unit 21, the time detecting unit 22, the speed detecting unit 23, and the overspeed information output unit 25 execute a function to warn a driver of overspeed according to the embodiment of the present invention. In addition, the speed determining unit 24 instructs the stop of the operation of the distance detecting unit 21, the time detecting unit 22, the speed detecting unit 23, and the overspeed information output unit 25 at the time when the vehicle passes by the regulation end position EP.

Figure 3:
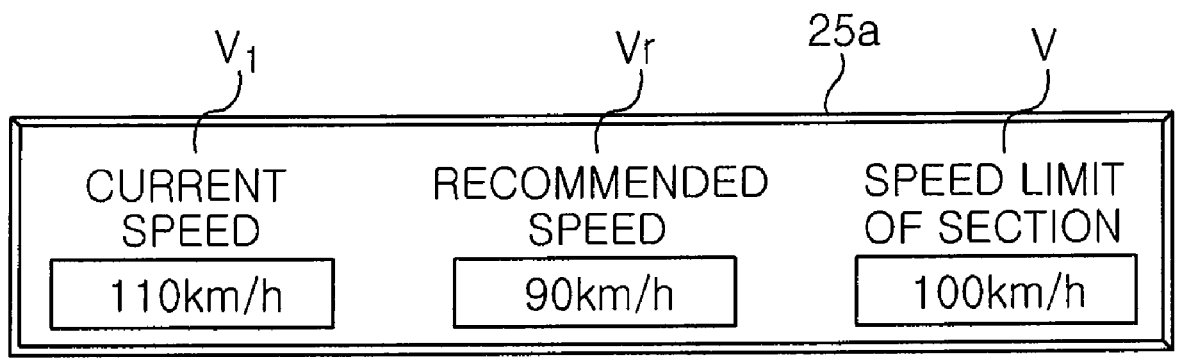
FIG. 3 is a view showing a display screen that displays section overspeed warning.

The overspeed information output unit 25 continuously or periodically informs a driver of overspeed through a screen and/or sound on the basis of the result transmitted from the speed determining unit 24. For example, as shown in FIG. 3, the overspeed information output unit 25 informs the driver of the recommended speed Vr and the current speed V1 of the vehicle by a display screen 25*a*. Further, the overspeed information output unit 25 may generate warning sound for warning that the current speed exceeds the recommended speed. The recommended speed Vr is a result obtained by calculating the right term of Expression (3) at the current time. Accordingly, the recommended speed Vr means the maximum speed in which the vehicle does not violate the speed limit of the section when the vehicle travels to the regulation end position EP at the recommended speed.

For example, when V is 100 km/h in Expression (3), S1 is 4 km, S2 is 6 km, and T1 is 2 minutes (that is, 2/60 hour), a recommended speed Vr of 90 km/h is obtained. Accordingly, when the vehicle travels to the regulation end position EP at the current speed of 110 km/h as shown in FIG. 3, the speed of the vehicle finally exceeds the speed limit of the section. For this reason, the driver adjusts the speed of the vehicle in consideration of the recommended speed Vr. The speed limit V of the section may also be displayed on the display screen 25*a* for reference.

Further, if the current speed of the vehicle exceeds the recommended speed as shown in FIG. 3, the overspeed information output unit 25 may output a voice message, such as "the vehicle overspeeds now. Please, reduce speed to 90 km/h or less", to the driver.

Figure 4:
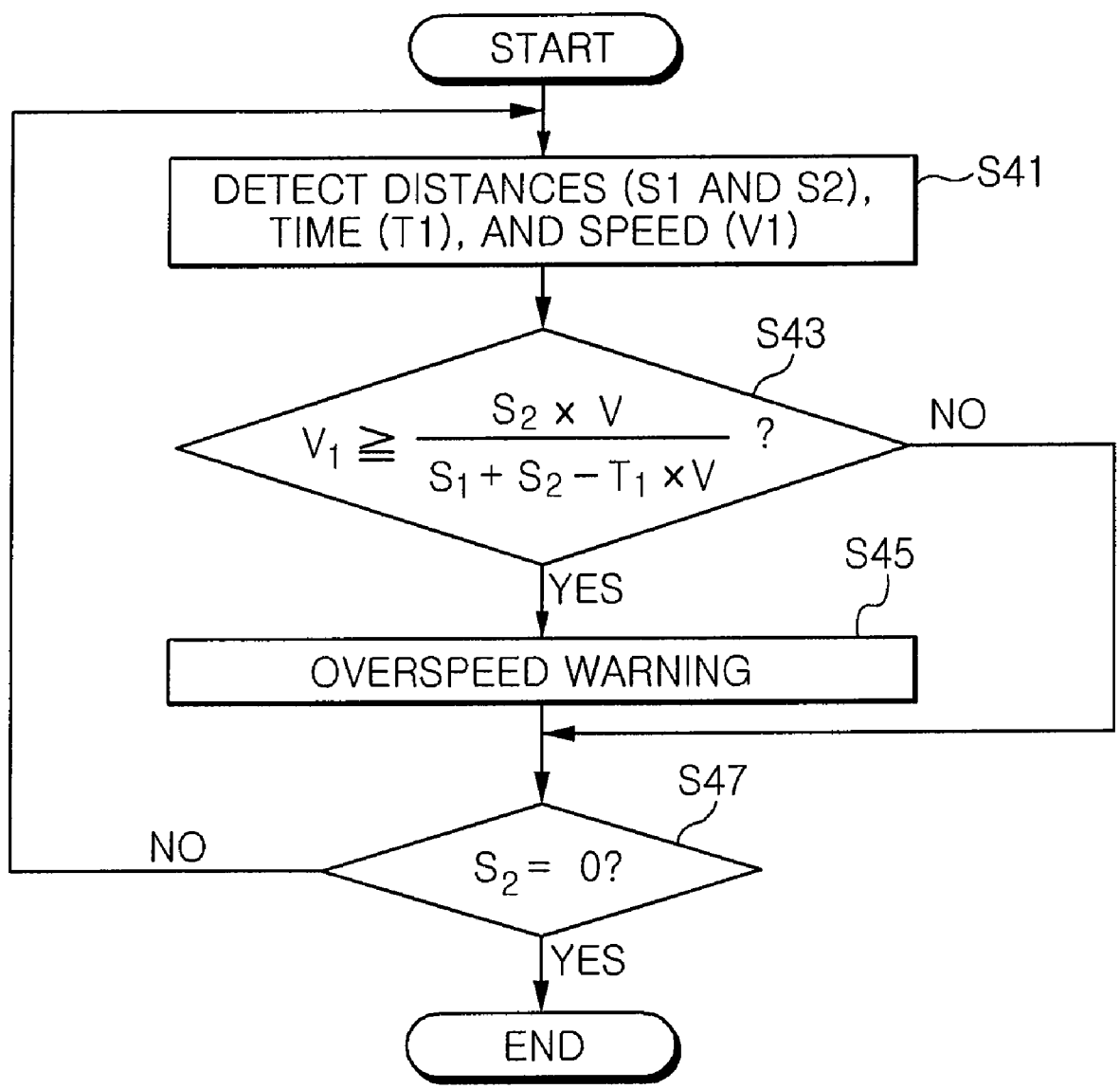
FIG. 4 is a flowchart illustrating a method of warning of section overspeed according to another embodiment of the present invention.

FIG. 4 is a flowchart illustrating the operation of the section overspeed warning apparatus 20 according to the embodiment of the present invention.

First, the distance S1 from the regulation start position SP to the current position of the vehicle and the distance S2 from the current position of the vehicle to the regulation end position EP are detected, the travel time T1 corresponding to the distance from the regulation start position SP to the current position of the vehicle is detected, and the current speed V1 of the vehicle is detected (S41).

Subsequently, it is determined whether the current speed V1 of the vehicle satisfies Expression (3) (S43). If the current speed of the vehicle satisfies Expression (3), an overspeed warning message is output to the driver (S45). If the current speed of the vehicle does not satisfy Expression (3), the procedure proceeds to Step S47.

In Step S47, it is determined whether a remaining distance S2 from the current position of the vehicle to the regulation end position EP is 0. If the remaining distance is 0, an overspeed warning process is ended. If the remaining distance is not 0, the procedure proceeds to Step S41 and the above-mentioned process is repeated.

Meanwhile, the present invention may be embodied as a computer readable recording medium on which a program for executing the above-mentioned method is recorded. Further, the above-mentioned embodiments of the present invention have been specified by specific configuration and drawings. However, it should be understood that the present invention is not limited to the specific embodiments. Therefore, it should be understood that the present invention may have various modifications and equivalents without departing from the scope of the present invention.

What is claimed is:

1. A section overspeed warning apparatus that warns a driver of the overspeed of a vehicle in an overspeed regulation section having a regulation start position and a regulation end position, the section overspeed warning apparatus comprising:
   a distance detecting unit configured to detect a travel distance from the regulation start position to a current position of the vehicle and a remaining distance from the current position of the vehicle to the regulation end position;
   a time detecting unit configured to detect a travel time taken for the vehicle to travel from the regulation start position to the current position of the vehicle;
   a speed detecting unit configured to detect current speed of the vehicle;
   a speed determining unit configured to determine whether the current speed of the vehicle will exceed a speed limit of the overspeed regulation section under the assumption that the vehicle travels to the regulation end position constantly at the current speed, by using the detected travel distance, the remaining distance, the travel time, and the current speed of the vehicle; and
   an overspeed information output unit configured to output an overspeed warning message to warn the driver of the overspeed when it is determined that the current speed of the vehicle will exceed the speed limit.

2. The section overspeed warning apparatus according to claim 1,
   wherein the speed determining unit determines that the current speed of the vehicle will exceed the speed limit if the following expression is satisfied:

$V1 \geq (S2 \times V) \div (S1+S2-T1 \times V)$ (where, $T1 \leq (S1+S2) \div V$), wherein V1 represents the current speed; S1 represents the detected travel distance; S2 represents the remaining distance; T1 represents the travel time; and V represents the speed limit.

3. The section overspeed warning apparatus according to claim 2,
   wherein the overspeed information output unit informs the driver of a result, which is obtained by calculating a right term of the expression, as a recommended speed.

4. The section overspeed warning apparatus according to claim 3,
   wherein the overspeed information output unit outputs messages including the recommended speed by using a display screen.

5. The section overspeed warning apparatus according to claim 3,
   wherein the overspeed information output unit outputs messages including the recommended speed by using voice.

6. The section overspeed warning apparatus according to claim 1,
   wherein information about the regulation start position, the regulation end position, and the current position of the vehicle is supplied by a navigation device including a GPS receiver.

7. The section overspeed warning apparatus according to claim 6,
   wherein the speed detecting unit detects the current speed of the vehicle using information that is supplied by the navigation device.

8. The section overspeed warning apparatus according to claim 1,
   wherein the overspeed information output unit informs the driver of a fact that it is determined that the current speed of the vehicle will exceed the speed limit, by using warning sound.

9. A section overspeed warning system that warns a driver of the overspeed of a vehicle in an overspeed regulation section having a regulation start position and a regulation end position, the section overspeed warning system comprising:
- a navigation device configured to supply information about the regulation start position, the regulation end position, and a current position of the vehicle; and
- a section overspeed warning device configured to detect whether a current speed of the vehicle will exceed a speed limit of the overspeed regulation section by using the information supplied from the navigation device, and to inform the driver of the detection result, wherein the section overspeed warning device includes:
- an information detecting unit configured to detect a travel distance from the regulation start position to the current position of the vehicle, a remaining distance from the current position of the vehicle to the regulation end position, and a travel time taken for the vehicle to travel from the regulation start position to the current position of the vehicle;
- a speed determining unit configured to determine whether the current speed of the vehicle will exceed the speed limit under the assumption that the vehicle travels to the regulation end position constantly at the current speed, by using the detected travel distance, the remaining distance, the travel time, and the current speed of the vehicle; and
- an overspeed information output unit configured to output an overspeed warning message to warn the driver of the overspeed when it is determined that the current speed of the vehicle will exceed the speed limit.

10. The section overspeed warning system according to claim 9,
wherein the speed determining unit determines that the current speed of the vehicle will exceed the speed limit if the following expression is satisfied:

$$V1 \geq (S2 \times V) \div (S1+S2-T1 \times V)(\text{where}, T1 \leq (S1+S2) \div V),$$

wherein V1 represents the current speed; S1 represents the detected travel distance; S2 represents the remaining distance; T1 represents the travel time; and V represents the speed limit.

11. The section overspeed warning system according to claim 10,
wherein the overspeed information output unit informs the driver of a result, which is obtained by calculating a right term of the expression, as a recommended speed.

12. The section overspeed warning system according to claim 11,
wherein the overspeed information output unit outputs messages including the recommended speed by using a display screen.

13. The section overspeed warning system according to claim 9,
wherein the navigation device supplies information about the current speed of the vehicle to the section overspeed warning device.

* * * * *